United States Patent
Ann

(10) Patent No.: US 7,889,999 B2
(45) Date of Patent: Feb. 15, 2011

(54) METHOD AND APPARATUS FOR CORRECTING COLOR IMBALANCE OF VISIBLE LIGHT IN WAVELENGTH DIVISION PARALLEL VISIBLE LIGHT COMMUNICATIONS

(75) Inventor: Jong-Hoon Ann, Suwon-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 576 days.

(21) Appl. No.: 12/020,622

(22) Filed: Jan. 28, 2008

(65) Prior Publication Data

US 2008/0181614 A1 Jul. 31, 2008

(30) Foreign Application Priority Data

Jan. 29, 2007 (KR) ...................... 10-2007-0008856

(51) Int. Cl.
*H04B 10/00* (2006.01)

(52) U.S. Cl. ..................................... 398/172

(58) Field of Classification Search .................. 398/172
See application file for complete search history.

(56) References Cited

U.S. PATENT DOCUMENTS

2007/0058987 A1 * 3/2007 Suzuki ...................... 398/183

FOREIGN PATENT DOCUMENTS

| KR | 2003-34080 | 5/2003 |
| KR | 2006-95495 | 8/2006 |

* cited by examiner

*Primary Examiner*—Shi K Li
(74) *Attorney, Agent, or Firm*—Cha & Reiter, LLC

(57) ABSTRACT

A method and an apparatus for correcting a color imbalance of visible light in wavelength division parallel visible light communications (VLC). The method includes the steps of: transmitting a visible light signal including information from a VLC transmitter to a VLC receiver during a preset correction unit, and setting correction bits corresponding to a basis for correcting a color imbalance by each of wavelengths of the VLC transmitter A generating of a first adjustment light corrects the color imbalance between the wavelengths from the VLC transmitter during a preset color adjustment period, and generating of a second adjustment light corrects a color imbalance between a previous correction unit and a current correction unit from the visible light communication transmitter.

18 Claims, 8 Drawing Sheets

METHOD AND APPARATUS FOR CORRECTING COLOR IMBALANCE OF VISIBLE LIGHT IN WAVELENGTH DIVISION PARALLEL VISIBLE LIGHT COMMUNICATIONS

CLAIM OF PRIORITY

This application claims the benefit of priority under 35 U.S.C. §119(a) from an application entitled "Method and Apparatus for Correcting Color Imbalance of Visible Light in Wavelength Division Parallel Visible Light Communications," filed in the Korean Intellectual Property Office on Jan. 29, 2007 and assigned Serial No. 2007-8856, the contents of which are hereby incorporated by reference in its entirety.

BACKGROUND OF THE INVENTION

1. Field of the Invention

The present invention relates to a method and an apparatus for correcting a color imbalance of visible light in wavelength division parallel visible light communications. More particularly, the present invention relates to a method and an apparatus for generating a visible light signal which corrects the energy differences among wavelengths when parallel transmission is implemented by using multiple wavelengths different from one another in a visible light communication (VLC) system.

2. Description of the Related Art

Recently, Light Emitting Diodes (LEDs) have been improved in luminous efficiency thereof, and have also dropped in unit price thereof. Accordingly, LEDs are now more commonly used not only in a special illumination market, such as handheld devices, displays, automobiles, traffic lights, advertising boards, etc., but also in a general illumination market, such as fluorescent lamps, incandescent electric lamps, etc. Also, as the interest in optical wireless technology complementary with RF technology has increased due to an exhaustion of the frequencies in a Radio Frequency (RF) band, and the possibility of a false cross among wireless communications coupled with an increase in the security requirement for communications, the advent of a very high-speed ubiquitous communication environment of a fourth generation mobile communication (4G) wireless technology, etc., is being studied. In particular, the use of visible light wireless communications using visible light LEDs is being studied by many enterprises and research institutes, etc.

Visible light communications, which transmits information by using light in the visible spectrum, provides some advantages that include a wide use band, and the ability to be freely used without being subject to regulation to the extent that other forms of communication are regulated. Also, visible light communications has an advantage in that the reception range of information can be accurately sensed because a spot where light reaches or a direction in which the light moves can be seen by a user. Accordingly, visible light communications have reliability with regard to security, and also have merit such as the ability to be drive with lower electric power than some of the other forms of communication.

Luminous elements for visible light communications have made rapid progress in recent days, but such luminous elements are not able to turn on/off at high speed. For example, in a case of a white LED using phosphor, its manufacturing cost is relative inexpensive but its modulation speed is no more than about 10 [Mbps]. In order to overcome this relatively slow modulation speed, studies are proceeding on a scheme in which visible light having information is generated from each LED by using multiple LEDs for generating three primary colors, including Red, Green, and Blue (RGB), and the generated visible lights are mixed to make white light. A scheme of transmitting signals in parallel by using the multiple LEDs for generating the three primary colors has an advantage in that high-speed transmission can be implemented, but in a case where respective energy distributions of wavelengths are different from one another, there appears a problem such that generated light can have a color tone other than white. If the generated light corresponds to light having any color tone other than the white light, this becomes a serious disadvantage in the visible light communications in which a transmitter serves as a lighting device at the same time. Hereinafter, a description will be made of a general apparatus for wavelength division parallel visible light communications, which transmits signals in parallel by using the multiple LEDs.

FIG. 1 is a block configuration diagram illustrating an example of a general transceiver for wavelength division parallel visible light communications. With reference to FIG. 1, a transmitter 101 for visible light communications includes multiple encoders 105, multiple modulators 111, a light generator (not shown), and a controller 103. Herein, the multiple encoders 105 are configured in parallel, and perform channel coding on data to be transmitted, respectively. The multiple modulators 111 are configured in parallel, and modulate respective channel-coded data from one of the multiple encoders 105. The light generator (not shown) transmits signals modulated by the multiple modulators 111 as visible signals, respectively. The controller 103 controls each configuration element of the transmitter 101 for visible light communications.

A receiver 102 for visible light communications includes a light sensor (not shown), multiple demodulators 112, multiple decoders 106, and a controller 104. Herein, the light sensor (not shown) receives visible light signals. The multiple demodulators 112 are configured in order to demodulate the visible light signals received by the light sensor, (not shown) respectively. The multiple decoders 106 receive respective signals demodulated by the multiple demodulators 112, perform channel decoding on the respective received signals in order to restore the respective received signals to original states thereof, and provide data. The controller 104 controls configuration elements of the receiver 102 for visible light communications. In the apparatus for wavelength division parallel visible light communications, paths independently operate by determining each path after through which path information is to be transmitted.

FIG. 2 is a flowchart illustrating transmission/receive (Tx/Rx) operations of wavelength division parallel visible light communications in general. Referring to FIG. 2, the transceiver for visible light communications begins to operate at step 200. In step 210, the transmitter for visible light communications transmits a visible light signal, and in step 220, the receiver for visible light receives the visible light signal from the transmitter for visible light communications. Thereafter, in step 230, it is determined whether the Tx/Rx operations are completed. If it is determined that the Tx/Rx operations are completed, in step 240 the method ends. However, if the operations are not complete at step 230, the procedure returns back to step 210, and the Tx/Rx operations are repeatedly performed it is determined that the Tx/Rx operations have been completed.

In the meantime, a color balance refers to a state where a final mixing of light has white color, as energy distributions in the specific ratio are achieved by the combination of each of wavelengths of visible light. A mixture of light is determined according to the energy ratio among the three primary colors. Namely, the energy distribution rate according to wavelength of light determines a color tone of the light. Specially, the white light has electric power existing over all the wavelength bands. The relation between energy by wavelengths and a color tone of the light can be found with reference to a chromaticity diagram.

Since parallel transmission can be achieved if different information is transmitted by each wavelength with dividing wavelengths of light by lengths, high-speed luminous elements are not required. The receiver filters a received light signal through an optical filter, and can extract and recover only from a signal having a desired wavelength. Because different information is transmitted by each wavelength, if the scheme of parallel transmission using the wavelength division is viewed from the aspect of the color balance, an energy balance may not be kept among multiple wavelengths, and visible light generated from the loss of the energy balance cannot provide white light. If the generated light corresponds to light having a color tone other than the color white, this difference in color tone becomes a serious problem in the visible light communications in which the transmitter serves as a lighting device at the same time engaging in communications.

SUMMARY OF THE INVENTION

Accordingly, the present invention has been made in part to solve at least some of the above problems occurring in the prior art. An exemplary aspect of the present invention to provide a method for correcting energy differences among wavelengths of different sizes when parallel transmission is implemented by using the multiple wavelengths different from one another, and to adjust the color imbalance created by the differences in energy among the different wavelengths, so that all generated light may comprise white light in a visible light communications system.

In accordance with one aspect of the present invention for accomplishing the above aspect, there is provided a method for correcting a color imbalance of visible light in wavelength division parallel visible light communications according to an exemplary embodiment of the present invention, including the steps of: transmitting a visible light signal including information from a visible light communication transmitter to a visible light communication receiver during a preset correction unit (period), and setting correction bits corresponding to a basis for correcting a color imbalance by each of wavelengths of the visible light communication transmitter; and generating first adjustment light necessary to correct the color imbalance between the wavelengths from the visible light communication transmitter during a preset color adjustment period, and generating second adjustment light necessary to correct a color imbalance between a previous correction unit (period) and a current correction unit (period) from the visible light communication transmitter.

In accordance with another aspect of the present invention, there is provided an apparatus for correcting a color imbalance of visible light in wavelength division parallel visible light communications according to another exemplary embodiment of the present invention, including: a visible light communication transmitter for transmitting a visible light signal including information to a visible light communication receiver during a preset correction period, for setting correction bits corresponding to a basis for correcting a color imbalance by each of wavelengths, for generating first adjustment light necessary to correct the color imbalance between the wavelengths during a preset color adjustment period, and for generating second adjustment light necessary to correct a color imbalance between a previous correction period and a current correction period; and a visible light communication receiver for receiving a visible light signal including information from the visible light transmitter during the preset correction period, and for ignoring a visible light signal received during a preset color adjustment period.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION OF THE INVENTION

Hereinafter, exemplary embodiments of the present invention will be described with reference to the accompanying drawings. The particulars such as specific configuration elements, etc., are described in the following description for illustrative purposes, and are thus only provided in order to assist in a more comprehensive understanding of the present invention. It will be obvious to those skilled in the art that predetermined changes in form or prescribed modifications may be made in these particulars within the spirit of the invention and the scope of the appended claims. Also, in describing the present invention, a detailed description in regard of the art known to the public related to the present invention will be omitted in a case where it is determined that the detailed description may obscure appreciation of the subject matter of the present invention by a person of ordinary skill in the art.

Figure 1:
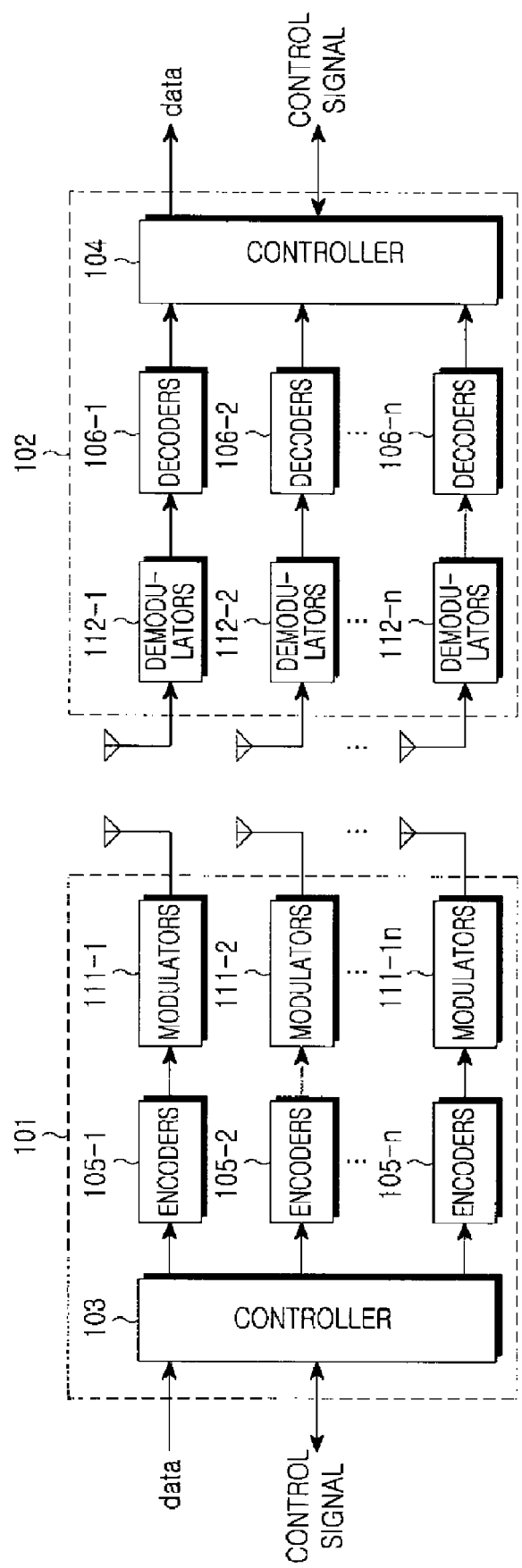
FIG. 1 is a block configuration diagram illustrating an example of a general transceiver for wavelength division parallel visible light communications.
Figure 2:
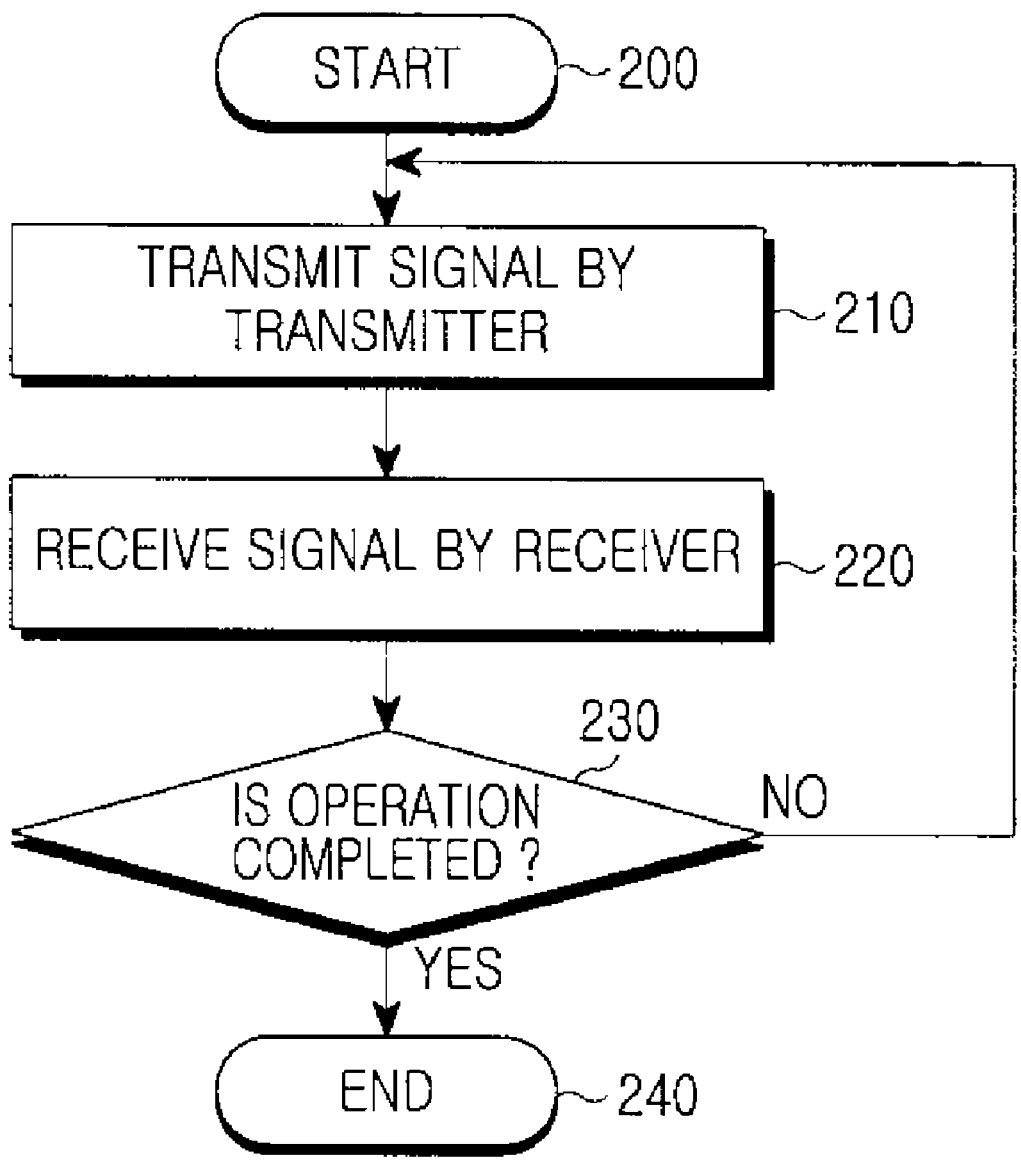
FIG. 2 is a flowchart illustrating Tx/Rx operations in general wavelength division parallel visible light communications.
Figure 3A:
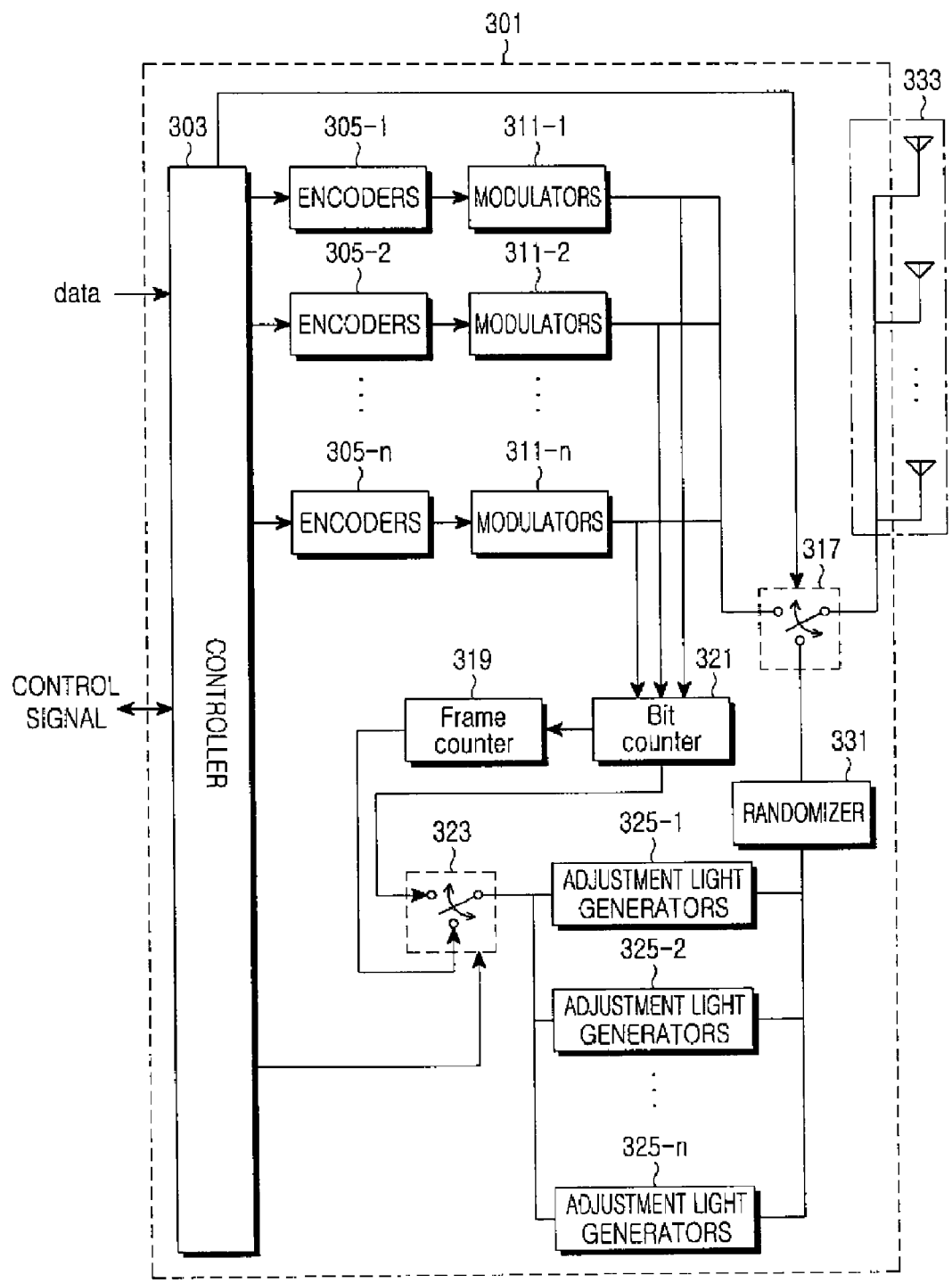
FIG. 3A is a block configuration diagram illustrating a transmitter for wavelength division parallel visible light communications according to an exemplary embodiment of the present invention.

FIG. 3A is a block configuration diagram illustrating a transmitter for wavelength division parallel visible light communications according to an exemplary embodiment of the present invention. With reference to FIG. 3A, the transmitter 301 for wavelength division parallel visible light communications (hereinafter, referred to as a "transmitter 301") typically includes multiple encoders 305, multiple modulators 311, a bit counter 321, a frame counter 319, a first switch 323, an adjustment light generator 325, a randomizer 331, a second switch 317, a light generator 333, and a controller 303.

Still referring to FIG. 3A, the multiple encoders 305 have a parallel configuration, and perform channel coding on data to be transmitted, respectively. The multiple modulators 311 have a parallel configuration, and modulate respective channel-coded data from the multiple encoders 305. The bit-counter 321 counts '1s' transmitted by each wavelength during a time unit comprising a period of time (hereinafter, referred to as a "correction unit") set for color correction, where '1' corresponds to a bit enabling a luminous element to turn on, and hereinafter is referred to as an "on-bit." The frame counter 319 stores the maximum number of frames from among the numbers of on-bits by respective wavelengths transmitted during a previous correction unit in order to correct a color imbalance between a previous correction unit and a current correction unit. The first switch 323 connects the bit counter 321 or the frame counter 319 with an adjustment light generator 325 according to a switching control signal.

The adjustment light generators 325 generate adjustment light as much as a value calculated by the bit counter or the frame counter. The randomizer 331 changes the order of the adjustment light generated from the adjustment light generator 325. The second switch 317 connects light carrying information or the adjustment light for color correction with the light generator according to a switching control signal. The light generator transmits a visible light signal. The controller 303 controls configuration elements of the transmitter 301 during a transmission operation, and outputs the switching control signal by determining a correction unit (period) during which data is transmitted and a color adjustment period for color correction.

Figure 3B:
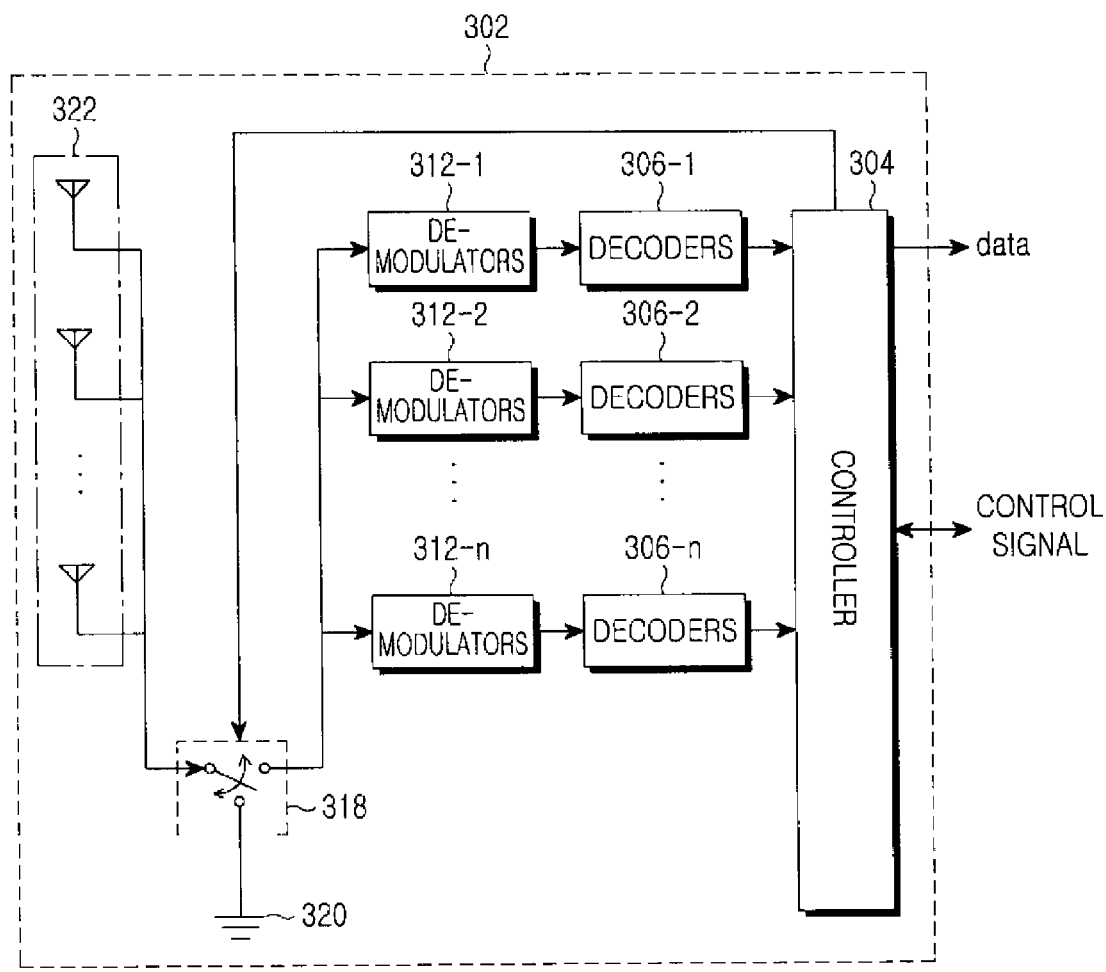
FIG. 3B is a block configuration diagram illustrating a receiver for wavelength division parallel visible light communications according to an exemplary embodiment of the present invention.

FIG. 3B is a block configuration diagram illustrating a receiver for wavelength division parallel visible light communications according to an exemplary embodiment of the present invention. With reference to FIG. 3B, the receiver 302 for wavelength division parallel visible light communications (hereinafter, referred to as a "receiver 302") includes a light sensor 322, a switch 319, multiple demodulators 312, multiple decoders 306, and a controller 304. Herein, the light sensor 322 receives a visible light signal. The switch 318 inputs the visible light signal received by the light sensor 322. Then, according to a switching control signal, the switch 318 connects the received visible light signal to a first path if the received visible light signal corresponds to a visible light signal including information, or connects a received signal to a ground (GND) corresponding to a second path if the received signal corresponds to adjustment light. The multiple demodulators 312 have a parallel configuration, and all demodulate a received signal from the switch 318. The multiple decoders 306 have a parallel configuration, receive signals demodulated by the multiple demodulators, respectively, and perform channel decoding on the respective received signals thereof. The controller 304 controls configuration elements of the receiver 302 during a receive operation, and outputs the switching control signal.

A description will be made of a method for correcting a color imbalance of visible light according to an exemplary embodiment of the present invention on the basis of each configuration element the above-described transceiver for wavelength division parallel visible light communications. In this example, the transmitter 301 classifies data to be transmitted by each path, and transmits classified data in parallel. While transmitting data for each wavelength during a preset correction period, the bit counter 321 counts on-bits of each wavelength transmitted during the correction unit, and determines, as correction bits ($T_c(\lambda)$), a difference value between the on-bits and the maximum by each wavelength on the basis of the maximum from among the numbers of on-bits of respective wavelengths. The correction bits ($T_c(\lambda)$) are represented as in the following EXPRESSION 1.

$$T_c(\lambda) = \text{Max}[T_o(\lambda_1), T_o(\lambda_2), T_o(\lambda_3), \ldots, T_o(\lambda_n)] - T_o(\lambda) \quad \text{EXPRESSION 1}$$

In the above EXPRESSION 1, $T_o(\lambda)$ represents an on-bit of a relevant wavelength. If $T_o(\lambda)$ corresponds to the color adjustment period, the second switch 317 of the transmitter 301 switches a connection to the light generator from light carrying information to adjustment light for color correction, and the bit counter 321 sets the correction bits to a correction value of a relevant wavelength by each wavelength. The adjustment light generator 325 generates adjustment light according to a correction value calculated by the bit counter 321. The adjustment light generated according to a correction value calculated by the bit counter 321 is referred as a "first adjustment light." The transmitter 301 coincides the number of on-bits, different from one another, by each wavelength with one another by using the first adjustment light. After causing the first adjustment light to be generated, the first switch 323 switches a connection to the adjustment light generator 325 from the bit counter 321 to the frame counter 319, and the frame counter 319 sets a correction value to a number calculated by subtracting the maximum of on-bit numbers transmitted during a current adjustment unit from the maximum of on-bit numbers transmitted during a previous adjustment unit. The adjustment light generator 325 generates adjustment light according to the correction value calculated by the frame counter 319. The adjustment light generated according to the correction value calculated by the frame counter 319 is referred to as a "second adjustment light." The transmitter 301 compensates the correction units for an energy difference therebetween by using the second adjustment light. The order of the first and second adjustment light generated through this process is changed by the randomizer 331. Also, the receiver 302 typically ignores a visible light signal received during a preset color adjustment period. The above process can be performed within a permissible range in a case where there are restrictions on a given color adjustment period.

Figure 4:
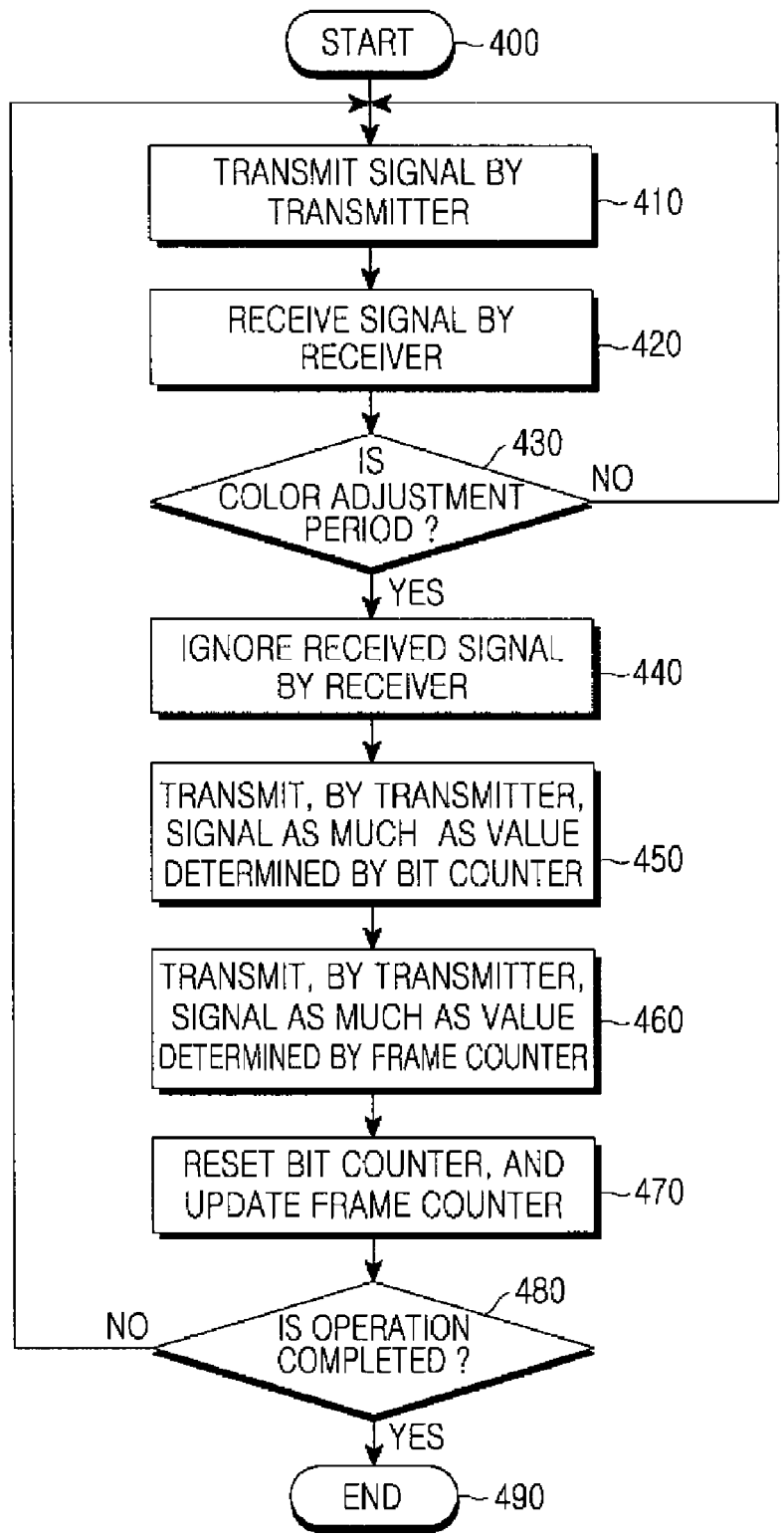
FIG. 4 is a flowchart illustrating Tx/Rx operations in wavelength division parallel visible light communications according to an exemplary embodiment of the present invention.

FIG. 4 is a flowchart illustrating Tx/Rx operations in wavelength division parallel visible light communications according to an exemplary embodiment of the present invention. With reference to FIG. 4, a description will be made of a flow of the Tx/Rx operations of an apparatus for wavelength division parallel visible light communications according to an exemplary embodiment of the present invention. When the Tx/Rx operations start, in step 410, the transmitter 301 begins to transmit data to the receiver 302. In step 420, the receiver 302 receives a signal transmitted from the transmitter 301. In step 430, it is determined whether the signal received by receiver 302 corresponds to a color adjustment period. If it is determined in step 430 that the received signal does not correspond to the color adjustment period, the procedure moves to step 410, and the Tx/Rx operations continue to be performed. If it is determined in step 430 that the received signal does correspond to the color adjustment period, the procedure moves to step 440, and the receiver 302 ignores a signal received during the color adjustment period. In step 450, a first adjustment light is generated by the adjustment light generator 325 as much as a value preset by the bit counter 321 of the transmitter 301. In step 460, a second adjustment light is generated by the adjustment light generator 325 as much as a value preset by the frame counter 319 of the transmitter 301. In step 470, the bit counter 321 is reset, and the frame counter 319 is updated to a maximum number of on-bits recorded in the bit-counter 321 as a current correction unit. In step 480, it is determined whether the Tx/Rx operations are completed. If it is determined in step 480 that the Tx/Rx operations are completed, the procedure moves to step 490 to end the Tx/Rx operations of the visible light communications. If it is determined in step 480 that the Tx/Rx operations are not completed, the procedure moves back to step 410 to repeat the Tx/Rx operations until the Tx/Rx operations are completed.

Figure 5A:
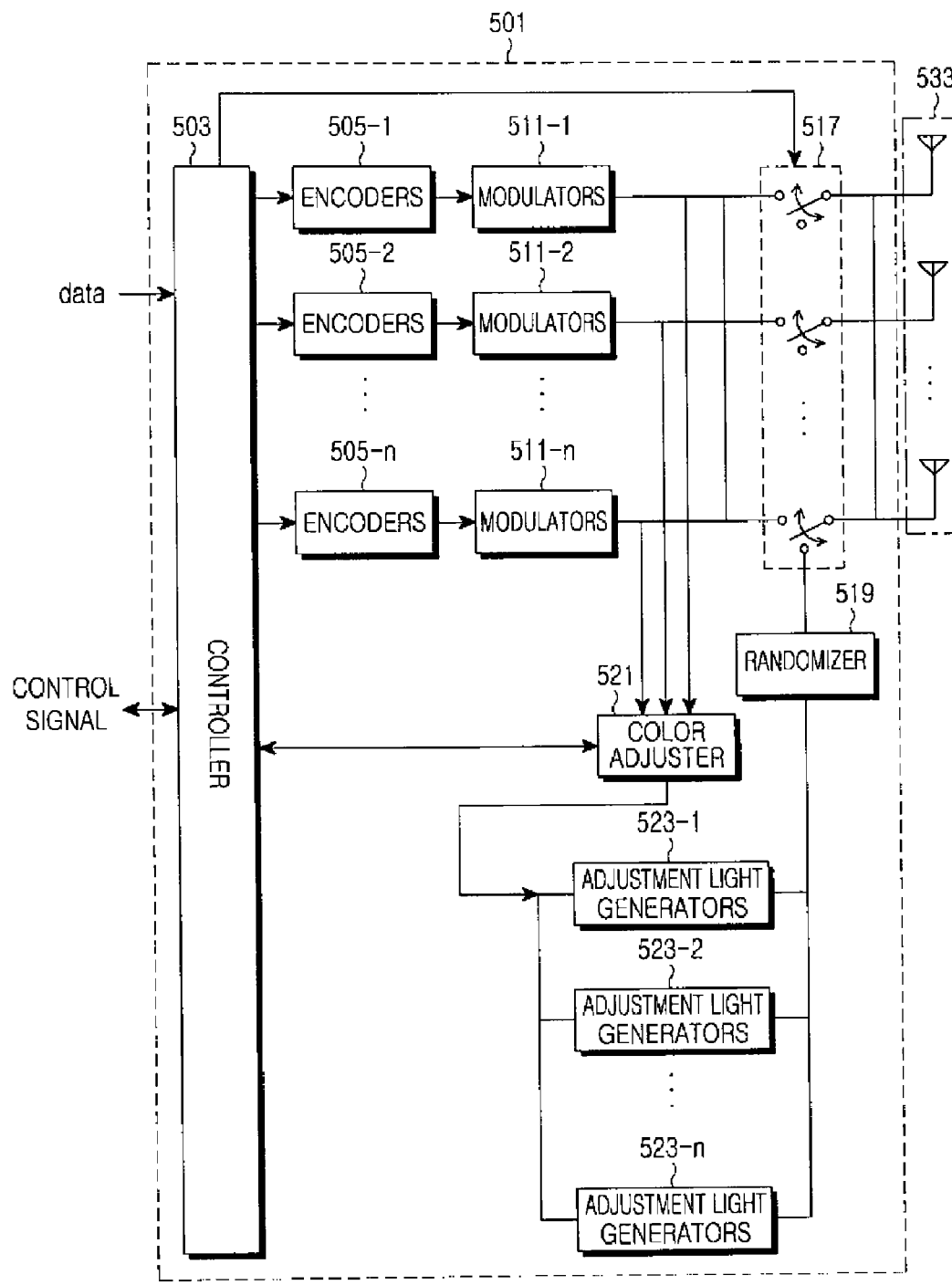
FIG. 5A is a block configuration diagram illustrating a transmitter for wavelength division parallel visible light communications according to another exemplary embodiment of the present invention.

FIG. 5A is a block configuration diagram illustrating a transmitter for wavelength division parallel visible light communications according to another exemplary embodiment of the present invention. With reference to FIG. 5A, the transmitter 501 for wavelength division parallel visible light communications (hereinafter, referred to as a "transmitter 501") includes multiple encoders 505, multiple modulators 511, a color adjuster 521, an adjustment light generator 523, a randomizer 519, multiple switches 517, a light generator 533, and a controller 503. Herein, the multiple encoders 505 have a parallel configuration, and perform channel coding on data to be transmitted, respectively. The multiple modulators 511 have a parallel configuration, and modulate respective channel-coded data from the multiple encoders 505. The color adjuster 521 calculates a color correction value on the basis of the number of on-bits by each wavelength and a preset threshold during a correction unit. The adjustment light generator 523 generates adjustment light as many as a value calculated by the color adjuster 521. The randomizer 519 changes the order of the adjustment light generated from the adjustment light generator 523. The switch 517 connects light carrying information by each wavelength or the adjustment light for color correction with the light generator according to a switching control signal. The light generator 533 transmits a visible light signal. The controller 303 controls configuration elements of the transmitter 501 during a transmission operation, and outputs the switching control signal of a relevant wavelength according to the number of on-bits of a specific wavelength.

Figure 5B:
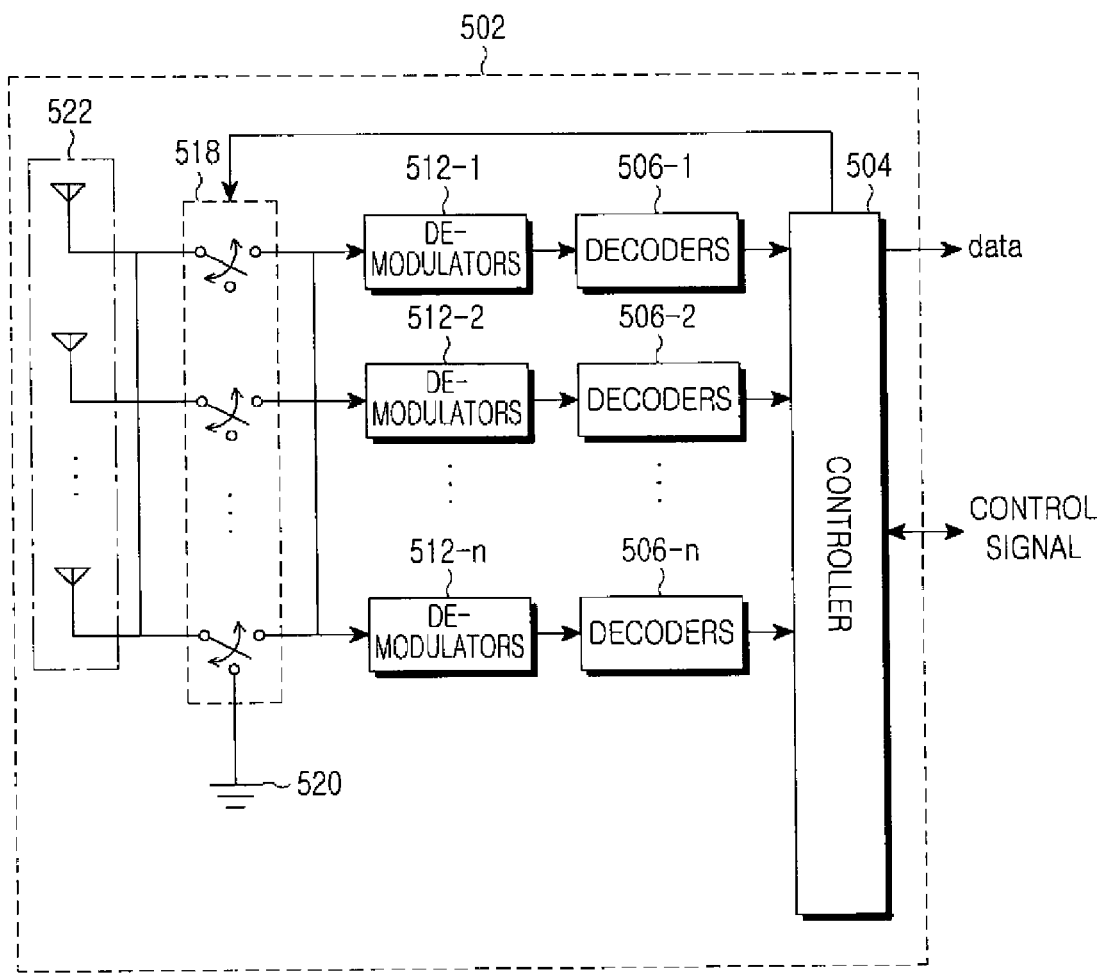
FIG. 5B is a block configuration diagram illustrating a receiver for wavelength division parallel visible light communications according to another exemplary embodiment of the present invention.

FIG. 5B is a block configuration diagram illustrating a receiver for wavelength division parallel visible light communications according to another exemplary embodiment of the present invention. With reference to FIG. 5B, the receiver 502 for wavelength division parallel visible light communications (hereinafter, referred to as a "receiver 502") includes a light sensor 522, multiple switches 518, multiple demodulators 512, multiple decoders 506, and a controller 504. Herein, the light sensor 522 receives a visible light signal. The multiple switches 518 have a parallel configuration, and input the visible light signal received by the light sensor 522. Then, according to a switching control signal, the multiple switches 518 connect the received visible light signal to a first path if a received signal corresponds to the visible light including information, or connect a received signal to a ground (GND) corresponding to a second path if the received signal corresponds to adjustment light. The multiple demodulators 512 have a parallel configuration, and demodulate respective receive signals thereof on receiving the respective receive signals including information through the first path from the switch 518. The multiple decoders 506 have a parallel configuration, receive signals demodulated by the multiple demodulators 512, respectively, and perform channel decoding on the respective received signals thereof. The controller 504 controls configuration elements of the receiver 502 during a receive operation, and outputs the switching control signal.

A description will be made of an exemplary method for correcting a color imbalance of visible light according to another exemplary embodiment of the present invention on the basis of each configuration element the above-described transceiver for wavelength division parallel visible light communications shown in FIGS. 5A and 5B. The transmitter 501 classifies data to be transmitted by each path, and transmits classified data in parallel. The color adjuster 521 regards a single correction unit as one window, and counts the number of on-bits by each wavelength while continuing to slide a queue to be transmitted. Then, if the number of on-bits of the specific wavelength is equal to or fewer than a preset threshold, the color adjuster 521 transmits a stop_receiving flag representing interruption of a receive operation through a path of a relevant wavelength to the receiver 502 via the controller 503, and enables the adjustment light generator 523 to generator as much adjustment light as a number calculated by subtracting the number of on-bits from a preset threshold in the relevant wavelength. After finishing the color correction, the color adjuster 521 transmits a start_receiving flat representing the resumption of the receive operation through the path of the relevant wavelength to the receiver 502 via the controller 503, and the transmitter 501 resumes the operation for transmitting information in the relevant wavelength. In the above process, the receiver 501 ignores signals received between the stop_receiving flag and the start_receiving flag.

Figure 6:
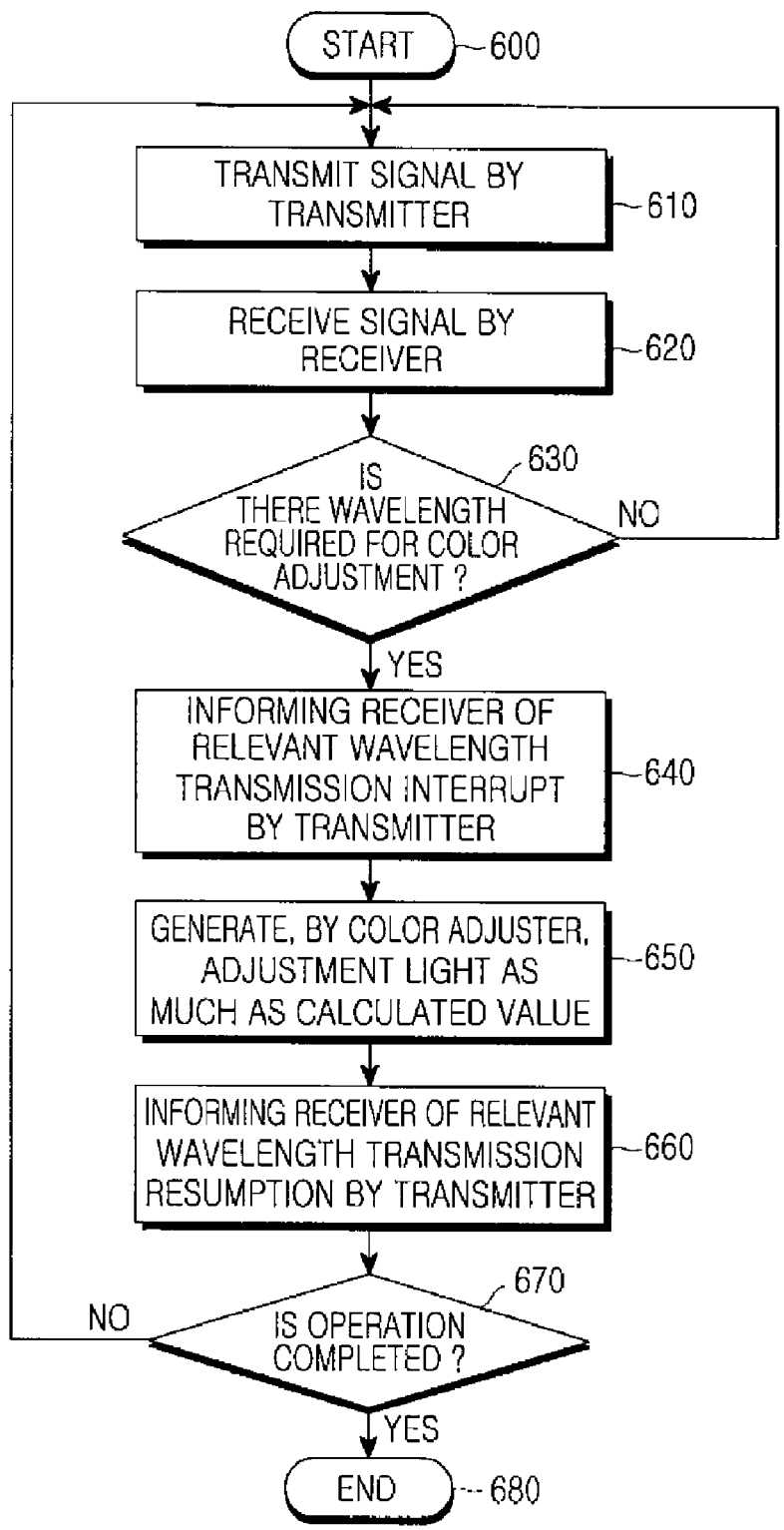
FIG. 6 is a flowchart illustrating Tx/Rx operations in wavelength division parallel visible light communications according to another exemplary embodiment of the present invention.

FIG. 6 is a flowchart illustrating Tx/Rx operations in wavelength division parallel visible light communications according to another exemplary embodiment of the present invention. With reference to FIG. 6, a description will be made of a flow of the Tx/Rx operations this exemplary embodiment of the present invention. When the Tx/Rx operations start, in step 610, the transmitter 501 begins transmitting data to the receiver 502. In step 620, the receiver 502 receives a signal transmitted from the transmitter 501. In step 630, as a relevant wavelength whose number of on-bits is fewer than a preset threshold is regarded as a wavelength requiring color adjustment, it is determined whether there exists a wavelength requiring for color adjustment. If it is determined in step 630 that there are no wavelength requiring color adjustment, the procedure moves to step 610, and the Tx/Rx operations continue to be performed. If it is determined in step 630 that there exists a wavelength requiring color adjustment, the procedure moves to step 640, and then the transmitter 501 informs the receiver 502 of transmission interruption of the relevant wavelength. In step 650, the color adjuster 521 calculates a number by subtracting the number of on-bits of the relevant wavelength from a preset threshold, and enables the adjustment light generator 523 to generate adjustment light as many as the calculated number. Thereafter, in step 670, it is determined whether the Tx/Rx operations are completed. If it is determined in step 670 that the Tx/Rx operations are completed, the procedure moves to step 680 to end the Tx/Rx operations of the visible light communications. If it is determined in step 670 that the Tx/Rx operations are not completed, the procedure moves back to step 610 to repeat the Tx/Rx operations until the Tx/Rx operations are completed.

The advantages and effects of exemplary embodiments of the present invention, disclosed herein, which are typically configured to operate as shown above, will be described as follows.

As the present invention is applied to a transceiver for wavelength division parallel visible light communications, the transmitter can generate white light suitable for lighting in harmony with an energy balance by each wavelength while transmitting a signal in parallel.

As described above, a configuration and an operation can be accomplished of a method and an apparatus for correcting a color imbalance of visible light in wavelength division parallel visible light communications according to exemplary embodiments of the present invention. While the invention has been shown and described with reference to certain exemplary embodiments thereof, it will be understood by those skilled in the art that various changes in form and details may be made therein without departing from the spirit and scope of the invention. Therefore, the spirit and scope of the present invention must be defined not by described exemplary embodiments thereof but by the appended claims. For example, while the invention and method are described as transmitter and receiver, a person of ordinary skill in the art understands that a single transceiver may provide the VLC transmission and reception functions.

What is claimed is:

1. A method for correcting a color imbalance of visible light in wavelength division parallel visible light communications (VLCs), the method comprising the steps of:
   (a) transmitting a visible light signal including information from a VLC transmitter to a VLC receiver during a preset correction period, and setting correction bits corresponding to a basis for correcting a color imbalance for each of the wavelengths of the VLC transmitter; and
   (b) generating a first adjustment light for correcting the color imbalance between the wavelengths from the VLC transmitter during a preset color adjustment period, and generating a second adjustment light for correcting a color imbalance between a previous correction period and a current correction period from the VLC transmitter.

2. The method as claimed in claim 1, wherein the correction bits in step (a) for each of the wavelengths are set to a difference value between a selected maximum and a number of on-bits for each wavelength by selecting a maximum from among numbers of on-bits of respective wavelengths transmitted from the VLC transmitter during the preset correction period.

3. The method as claimed in claim 1, wherein the first adjustment light is generated according to a first correction value by setting the first correction value to a value of the correction bits for each wavelength.

4. The method as claimed in claim 1, wherein the second adjustment light is generated according to a second correction value by setting a second correction value to a value calculated by subtracting the maximum from among the numbers of on-bits transmitted during a current correction period from the maximum from among the numbers of on-bits transmitted during a previous correction period.

5. The method as claimed in claim 1, wherein the VLC receiver ignores a visible signal received during a preset color adjustment period.

6. An apparatus for correcting a color imbalance of visible light in wavelength division parallel visible light communications (VLCs), the apparatus comprising:
   a VLC transmitter for transmitting a visible light signal including information to a VLC receiver during a preset correction period, for setting correction bits corresponding to a basis for correcting a color imbalance by each of the wavelengths, for generating a first adjustment light necessary to correct the color imbalance between the wavelengths during a preset color adjustment period, and for generating a second adjustment light necessary to correct a color imbalance between a previous correction period and a current correction period; and
   a VLC receiver for receiving a visible light signal including information from the visible light transmitter during the preset correction period, and for ignoring a visible light signal received during a preset color adjustment period.

7. The apparatus as claimed in claim 6, wherein the VLC transmitter correction bits for each wavelength are set to a difference value between a selected maximum and a number of on-bits for each wavelength by selecting a maximum from among the numbers of on-bits of respective wavelengths transmitted from the VLC transmitter during the preset correction period.

8. The apparatus as claimed in claim 6, wherein the first adjustment light is generated by the VLC transmitter according to a first correction value which is set to a value of the correction bits for each wavelength.

9. The apparatus as claimed in claim 6, wherein the second adjustment light is generated by the VLC transmitter according to a second correction value which is set to a value calculated by subtracting a maximum from among numbers of on-bits transmitted during a current correction period from the maximum from among the numbers of on-bits transmitted during a previous correction period.

10. The apparatus as claimed in claim 6, wherein the VLC transmitter comprises:
    a plurality of encoders having a parallel configuration for performing channel coding on data to be transmitted, respectively;
    a plurality modulators having a parallel configuration for modulating respective channel-coded data from the plurality of encoders;
    a bit counter for counting on-bits transmitted by each wavelength during the preset correction period;
    a frame counter for storing the maximum from among the numbers of on-bits of respective wavelengths transmitted during a previous correction unit;
    a first switch for connecting the bit counter or the frame counter with a adjustment light generator according to a switching control signal;
    an adjustment light generator for generating adjustment light;
    a randomizer for changing an order of the adjustment light generated from the adjustment light generator;
    a second switch for connecting light carrying information or the adjustment light for color correction with the light generator according to a switching control signal;
    a light generator for transmitting a visible light signal; and
    a controller for controlling configuration elements of the VLC transmitter during a transmission operation, and for outputting the switching control signal by dividing a time interval into a correction period during which data is transmitted and a color adjustment period for color correction.

11. The apparatus as claimed in claim 6, wherein the VLC receiver comprises:
    a light sensor for receiving a visible light signal;
    a switch for inputting the visible light signal received by the light sensor, and for connecting a received signal to a first path when the received signal corresponds to visible light including information and connecting the received signal to a ground (GND) corresponding to a second path when the received signal corresponds to an adjustment light, according to a switching control signal;
    a plurality of demodulators having a parallel configuration for inputting the received signal including information through the first path, and for demodulating the received signal;

a plurality of decoders having a parallel configuration for receiving respective signals demodulated by the plurality of demodulators, and for performing channel decoding on the respective received signals thereof; and a controller for controlling configuration elements of the VLC receiver during a receive operation, and for outputting the switching control signal.

12. The apparatus as claimed in claim 10, wherein the bit counter is reset after the completion of a preset color adjustment period since the generation of the first adjustment light and the second adjustment light from the VLC transmitter.

13. The apparatus as claimed in claim 10, wherein the frame counter is updated to a maximum from among the numbers of on-bits transmitted during a current correction period stored in the bit-counter after the completion of a preset color adjustment period since the generation of the first adjustment light and the second adjustment light from the VLC transmitter.

14. A method for correcting a color imbalance of visible light in wavelength division parallel visible light communications (VLCs), the method comprising the steps of:

transmitting a visible light signal including information from a visible light communication transmitter to a VLC receiver during a preset correction period;

transmitting a stop_receiving flag representing interruption of a receive operation through a path of a specific wavelength if a number of on-bits of a specific wavelength is equal to or fewer than a preset threshold while counting the number of on-bits for each wavelength during the preset correction period by the VLC transmitter;

comparing the number of on-bits of the specific wavelength with a preset threshold, and generating adjustment light corresponding to a number calculated by subtracting the number of on-bits from the preset threshold through a path of the specific wavelength by the VLC transmitter; and resuming the transmission of the visible signal through the path of the specific wavelength by transmitting a start_receiving flag through the path of the specific wavelength after the completion of the process for generating the adjustment light by the VLC transmitter.

15. The method as claimed in claim 14, wherein signals received between the stop_receiving flag and the start_receiving flag are ignored by the VLC receiver.

16. An apparatus for correcting a color imbalance of visible light in wavelength division parallel visible light communications (VLCs), the apparatus comprising:

a VLC transmitter for transmitting a stop_receiving flag through a path of a specific wavelength if a number of on-bits of a specific wavelength is equal to or fewer than a preset threshold while counting the number of on-bits transmitted by each wavelength during a preset correction period, for comparing the number of on-bits of the specific wavelength with a preset threshold and for generating adjustment light in accordance with a number calculated by subtracting the number of on-bits from the preset threshold through a path of the specific wavelength, and for transmitting a start_receiving flag through the path of the specific wavelength after the generation of the adjustment light; and a VLC receiver for receiving a visible light signal including information from the VLC transmitter to a VLC receiver during a preset correction period, and for ignoring signals received between the stop_receiving flag and the start_receiving flag.

17. The apparatus as claimed in claim 16, wherein the VLC transmitter comprises:

a plurality of encoders having a parallel configuration for performing channel coding on data to be transmitted, respectively;

a plurality of modulators having a parallel configuration for modulating respective channel-coded data from the plurality of encoders;

a color adjuster for calculating a color correction value on the basis of the number of on-bits by each wavelength and a preset threshold during a correction period;

an adjustment light generator for generating an adjustment light;

a randomizer for changing the order of the adjustment light generated by the adjustment light generator;

a plurality of switches having a parallel configuration for connecting light carrying information for each wavelength or the adjustment light for color correction with a light generator according to a switching control signal;

the light generator for transmitting the visible light signal; and a controller for controlling configuration elements of the VLC transmitter during a transmission operation, and for outputting the switching control signal of each wavelength.

18. The apparatus as claimed in claim 16 wherein the VLC receiver comprises:

a light sensor for receiving a visible light signal;

a plurality of switches having a parallel configuration for inputting the visible light signal received by the light sensor, and for connecting the received visible light signal to a first path when a received signal corresponds to the visible light signal including information and connecting a received signal to a ground (GND) corresponding to a second path when the received signal corresponds to an adjustment light according to a switching control signal;

a plurality of demodulators having a parallel configuration for demodulating respective receive signals thereof on receiving the respective receive signals including information through the first path from the plurality of switches;

a plurality of decoders having a parallel configuration for performing channel decoding on respective received signals thereof on receiving the respective signals demodulated by the plurality of demodulators; and a controller for controlling configuration elements of the VLC receiver during a receive operation, and for outputting the switching control signal.

* * * * *